United States Patent
Kaplan et al.

(10) Patent No.: US 10,142,178 B2
(45) Date of Patent: Nov. 27, 2018

(54) DISCOVERING AND MITIGATING OUT-OF-SYNC NETWORK PARAMETERS

(71) Applicant: Red Hat Israel, Raanana (IL)

(72) Inventors: Alona Kaplan, Raanana (IL); Michael Kolesnik, Netanya (IL)

(73) Assignee: RED HAT ISRAEL, LTD., Raanana (IL)

( * ) Notice: Subject to any disclaimer, the term of this patent is extended or adjusted under 35 U.S.C. 154(b) by 280 days.

(21) Appl. No.: 15/253,496

(22) Filed: Aug. 31, 2016

(65) Prior Publication Data

US 2018/0062926 A1    Mar. 1, 2018

(51) Int. Cl.
   *G06F 15/173* (2006.01)
   *H04L 12/24* (2006.01)
   *H04L 12/46* (2006.01)

(52) U.S. Cl.
   CPC ...... *H04L 41/0816* (2013.01); *H04L 41/0869* (2013.01); *H04L 41/0883* (2013.01); *H04L 12/4641* (2013.01); *H04L 41/22* (2013.01)

(58) Field of Classification Search
   CPC ............. H04L 41/0816; H04L 41/0869; H04L 41/0883
   USPC ........................................................ 709/224
   See application file for complete search history.

(56) References Cited

U.S. PATENT DOCUMENTS

| | | |
|---|---|---|
| 6,711,411 B1 | 3/2004 | Ruffini |
| 6,834,304 B1 * | 12/2004 | Nisbet ............ H04J 3/14 707/999.2 |
| 7,366,989 B2 | 4/2008 | Naik et al. |
| 7,783,746 B2 | 8/2010 | Hand et al. |
| 8,160,075 B2 | 4/2012 | Kazmi et al. |
| 8,429,630 B2 | 4/2013 | Nickolov et al. |
| 8,732,182 B2 | 5/2014 | Bethlehem et al. |
| 2007/0150819 A1 | 6/2007 | Goodman et al. |
| 2015/0312173 A1 | 10/2015 | May et al. |

OTHER PUBLICATIONS

Cisco, Cisco Unified Presence Server Administration Guide, Release 1.0(2), <cisco.com/c/en/us/td/docs/voice_ip_comm/cups/1_0_2/english/administration/guide/1_0_2/b02svprm.html>, downloaded on Jul. 4, 2016, Copyright 2016, 4 pages.

Vernia, Bug 1194297—[RFE] Allow to synchronize only out-of-sync networks on an host [NEEDINFO], <bugzilla.redhat.com/show_bug.cgi?id=1194297>, published on Feb. 19, 2015, 3 pages.

(Continued)

*Primary Examiner* — Wing F Chan
*Assistant Examiner* — Joseph R Maniwang
(74) *Attorney, Agent, or Firm* — Womble Bond Dickinson (US) LLP; Daniel Ovanezian

(57) ABSTRACT

A system for discovering and mitigating out-of-sync network parameters may determine that a first value for a parameter of a set of parameters of a logical network associated with a host computing system is different from a second value specified for the parameter in a network definition. The system may further presenting, via a user interface, the first value and the second value for the parameter and receiving, via the user interface, a confirmation of validity of the first value for the parameter. Responsive to ascertaining validity of remaining parameters of the set of parameters, setting a validity attribute of the logical network.

20 Claims, 7 Drawing Sheets

(56) References Cited

OTHER PUBLICATIONS

Red Hat, Inc., Red Hat Enterprise Linux 6, 6.4 Technical Notes, Detailed notes on the changes implemented in Red Hat Enterprise Linux 6.4, Edition 4, <access.redhat.com/documentation/en-US/Red_Hat_Enterprise_Linux/6/html-single/6.4_Technical_Notes/>, Copyright 2013-2016, 3 pages.

Oracle, Oracle Forms and Reports Services 11gR2 Configuration Notes, <oracle-base.com/articles/11g/oracle-forms-and-reports-11gr2-configuration-notes>, downloaded on Jul. 4, 2016, 10 pages.

* cited by examiner

DISCOVERING AND MITIGATING OUT-OF-SYNC NETWORK PARAMETERS

TECHNICAL FIELD

The present disclosure is generally related to management of networks by computer systems.

BACKGROUND

Virtualization may be viewed as abstraction of some physical components into logical objects in order to allow running, for example, various operating systems concurrently and in isolation from other operating systems on one or more interconnected physical computer systems. Virtualization allows, for example, consolidating multiple physical servers into one physical server running multiple virtual machines in order to improve the hardware utilization rate. Virtualization may be achieved by running a layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines. For example, the hypervisor may attach one or more logical networks to a physical network device for use by virtual machines managed by the hypervisor.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
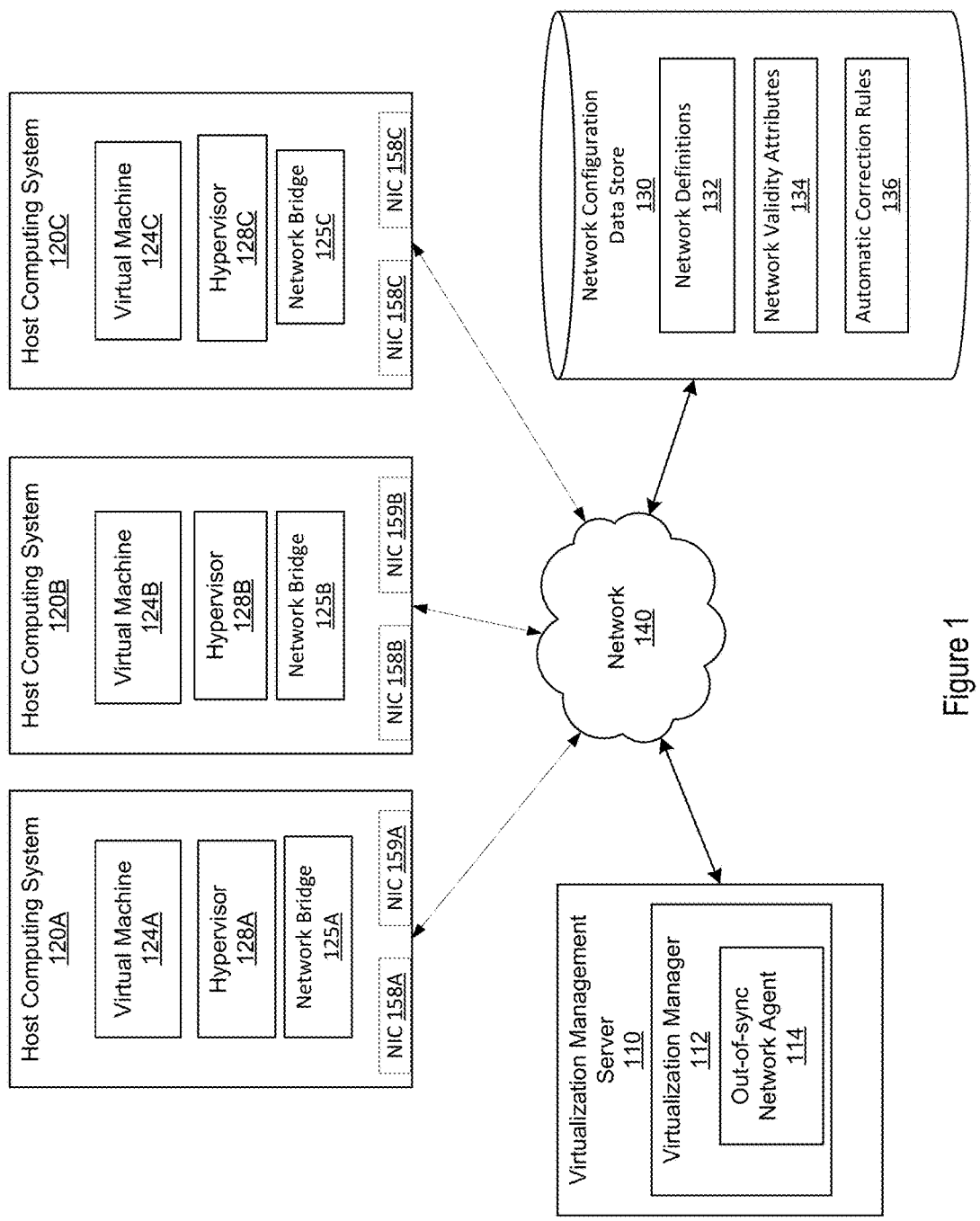
FIG. 1 depicts a block diagram of a system for detecting and mitigating out-of-sync networks, according to one or more aspects of the present disclosure.

Described herein are methods and systems for detection and mitigation of out-of-sync networks in a virtualized environment. The virtualized environment refers to a distributed computer system which includes host machines that each run one or more virtual machines by executing a hypervisor to abstract the physical layer, including processors, memory, and I/O devices, and present this abstraction to the virtual machines as virtual devices. The virtualized environment is centrally managed by a virtualization manager that is coupled to the host machines over a network.

An "out-of-sync" network refers herein to a logical network on a host machine, such that a value of at least one parameter of the network differs from a value of the same parameter in a network definition stored by the virtualization manager. The network definition may specify parameters of a logical network and predefined values of these parameters. For example, the network parameters may include a virtual local area network identifier (VLAN ID), the maximum transmission unit (MTU), the quality of service (QoS) class, etc. When establishing a logical network on a host machine, the host machine may configure its parameters. In one example, a logic network may be established on a host machine by defining a bridge (e.g., a virtual bridge) associated with a network interface card (NIC) of the host machine. The bridge may then be associated with a virtual NIC (vNIC) of a virtual machine to dedicate the NIC of the host machine to the virtual machine.

In order for the virtualization manager to be able to manage the logical networks configured at the host machines, those networks are expected to be in sync (i.e., share the parameter values) with the corresponding network definitions maintained by the virtualization manager. Otherwise, if at least one parameter of a logical network differs from the network definition, such a network may be declared to be out-of-sync, and may be excluded from the management scope of the virtualization manager. In some situations, one or more parameters of a logical network may be configured with values other than those specified in a network definition or they may be initially configured with the matching values but subsequently changed (e.g., by a program running on the host machine or another machine, or intentionally by an administrator). However, because such a mismatch causes the logical network to be out-of-sync, which in turn excludes it from the management scope, the administrator typically does not have the ability to re-configure this out-of-sync network or to confirm that the updated parameter is valid.

Aspects of the present disclosure address the above and other deficiencies by discovering an out-of-sync network and ensuring that such a network is no longer excluded from the management scope of the virtualization manager. In particular, the virtualization manager may maintain a network definition (e.g., in a configuration file, a table or any other data structure) that includes predefined (valid) parameters for a network in the virtualization environment. The virtualization manager may monitor logical networks at the host machines to discover if any of these networks are out-of-sync (i.e., if any network parameter of a logical network has a value that does not match a value of the corresponding parameter in the network definition). Upon discovering an out-of-sync network, the virtualization manager may present a graphical user interface (GUI) (e.g., a GUI of the administrator portal) with a list of parameters that are out-of-sync. In some implementations, the GUI may indicate whether the parameters need to be synced with the network definition, or if the logical network may continue to operate with the out-of-sync parameters. In some implementations, the GUI may allow a user (e.g., a system administrator) to confirm that an out-of-sync parameter is valid (to "waive" an out-of-sync parameter). If each of the out-of-sync parameters of the logical network is valid, the logical network may be marked as valid ("in sync") and the virtualization manager may ignore the mismatched parameters when determining whether the network is out-of-sync at the host computer system.

In one example, a data center may include multiple groups of host machines with logical networks connected via a LAN. In the data center, one group of host machines may use a VLAN ID of "10" for their logical networks and another group of host machines may use a VLAN ID of "20" for their logical networks. The data center may have a main switch enabling the connection between the groups of host machines, and the main switch may be able to perform a translation between the VLAN ID of 10 and the VLAN ID of 20 of the groups of host machines. Because the VLAN IDs of the logical networks are different, the virtualization manager may determine that the logical networks on the host machines are out-of-sync. However, rather than excluding these logical networks from its management scope, the virtualization manager may present a GUI (e.g., through an administrator portal) for such an out-of-synch logical network, indicating that a VLAN ID of the logical network is out-of-sync. In one example, the GUI may provide this indication by presenting the actual value of VLAN ID of the logical network and a different value specified for the VLAN ID in the network definition. The administrator may know that the switch is capable of translating the VLAN ID during communications and may specify, via the GUI, that the value of the VLAN ID is valid. Alternatively, the virtualization manager may determine the logical network may be able to operate properly with the current VLAN ID (e.g., due to the switch capability) and may indicate, in the GUI, that the current VLAN ID is valid despite the mismatch.

The example above is given with respect to the VLAN ID parameter, however, any other parameter of a logical network may be determined to be valid despite its mismatch with the network definition. For example, a value of an MTU parameter for some logical networks may be different from the value specified in the network definition based on hardware configurations. However, if there is a switch that can perform MTU translations, such as by splitting network packets, then the MTU parameter may be considered valid for the logical network.

Accordingly, aspects of the present disclosure improve the performance of virtual networks by allowing management of the networks when one or more parameters do not match the network definition. This may enable an administrator to set a particular parameter to a preferred value for a logical network on a host machine that is different than a value specified by a network definition. The virtualization manager may further maintain management scope over the logical network by determining that the mismatched parameter is valid even though it is out-of-sync. Furthermore, aspects of the present disclosure may improve operation of computers in general by no longer wasting computing (processing) resources for creating logical networks that could not be used (as they were not within the management scope of the virtualization manager), by no longer wasting storage resources for storing parameters of unusable logical networks. Moreover, aspects of the present disclosure further networking capabilities of host machines in a data center by allowing re-configuration of previously unusable logical networks. FIG. 1 is a block diagram of one illustrative example of a distributed computer system 100 representing a virtualized environment. The virtualized environment may include a plurality of host computing systems 120A-120C and a virtualization management server 110.

The host computing systems 120A-120C may communicate to one another and to the virtualization management server 110 through a network 140.

Host computing system 120A may be a server, a mainframe, a workstation, a personal computer (PC), a mobile phone, a portable computing device, etc. Host computing system 120A may run a host operating system that manages the hardware resources of the computer system 120A and that provides functions such as inter-process communication, scheduling, memory management, and so forth. In some implementations, the host computing system 120A may also include a hypervisor 128A, which may be a computer program that provides a virtual operating platform for one or more virtual machines 124A, and manages the execution of the virtual machines 124A.

The hypervisor 128A may take various forms. For example, the hypervisor 128A may be part of or incorporated in the operating system of computer system 120A, or the hypervisor 128A may be running on top of a host operating system. Alternatively, the hypervisor 128A may be a "bare metal" hypervisor that runs on hardware of the host computing system 120A without an intervening operating system. The hypervisor 128A manages system resources, including access to I/O devices, memory devices, processing devices, and the like of the host computing system 120A. The hypervisor 128A can present to virtual machines 124A an abstraction of the physical layer that may provide the same or different abstractions to various guest programs, such as guest operating system, guest applications, etc. Some examples of hypervisors include quick emulator (QEMU®), kernel mode virtual machine (KVM), virtual machine monitor (VMM), etc.

The hypervisor 128A may support a virtual machine 124A residing on the host computing system 120A. In some implementations, more than one virtual machine may reside on the host computing system 120A. The virtual machine 124A may execute programs as though the virtual machine 124A was a physical machine.

The virtualization management server 110 may receive information about the operation of each hypervisor 128A-128C managed by the server. The information received by virtualization management server 110 may include data describing the host computing system's storage, memory and networks as well as virtual machine creation, other host administration tasks, statistics gathering, and log collection. For example, the virtualization management server 110 may receive data describing the operation of a hypervisor from a daemon executing on the host computing system 120A.

The virtualization management server 110 may include a virtualization manager 112. The virtualization manager 112 may monitor hypervisors and virtual machines running on various host computing systems. The virtualization manager 112 may further send commands to host computing systems 120A-120C instructing the computing systems 120A-120C or hypervisors 128A-128C to perform specified operations. For example, the virtualization manager 112 may instruct a host computing system 120A-120C to establish a connection to a logical network, change configuration parameters of a logical network, provide information regarding network configurations, or perform other operations.

The virtualization manager 112 may include an out-of-sync network agent 114 that monitors logical networks implemented on host computing systems. The out-of-sync network agent 114 may compare parameters of logical networks to network definitions for the logical networks. The out-of-sync network agent 114 may further use data in a network configuration data store 130. The data in the configuration data store 130 may include network definitions 132, network validity attributes 134, and automatic correction rules 136. The network definitions 132 may include a definition for each of the logical networks implemented by one of the host computing systems 120A-120C. Each network definition may include a set of parameters that are specified for the logical network.

The network validity attributes 134 may include a validity attribute for each logical network attached to each host computing system. For example, a validity attribute for a logical network may include an indication of whether the logical network is in-sync or out-of-sync with the network definition. The network validity attributes 134 may also store indications of parameters that have been waived for particular logical networks. For example, the out-of-sync network agent 114 may store an indication that an attribute has been waived for a particular logical network on a particular host computing system. The indication may be associated with a network identification that identifies the logical network.

The automatic correction rules 136 may include a set of rules to determine when a parameter for a logical network may be automatically corrected. For example, the automatic correction rules may indicate that a parameter may be replaced automatically with a value in the network definition for the logical network. For example, a rule may indicate that a parameter having a certain parameter type (e.g., VLAN ID, MTU, etc.), may be automatically corrected by the out-of-sync network agent 114. Other rules may determine that a parameter may be automatically corrected if the parameter for a logical network is missing. Accordingly, the missing value for the parameter may be replaced with the value for the parameter in the network definition. Other rules may determine that a parameter may be automatically corrected based on the difference of the value of the parameter for the logical network and the network definition. For example, the out-of-sync network agent 114 may determine a difference between the values, then, based on the value not being within a range specified in the rules, the out-of-sync network agent 114 may automatically set the value of the parameter to the value in the network definition. In some implementations, the rules may instead automatically correct a parameter that is within a range specified by the rules. In some implementations, other rules may specify when and how to automatically correct different parameters based on the parameter type, values of the parameters, or other characteristics of the parameters. In some implementations, the automatic correction rules 136 may be different for different logical networks or host computing systems.

In FIG. 1, network bridge 125A associated with NIC 158A is defined to establish a logical network on the host computing system 120A, and the network bridge 125A is associated with virtual NIC (vNIC) (not shown) of virtual machine 124A to dedicate the NIC 158A to the virtual machine 124A. For example, the network bridge 125A may route messages received at the NIC 158A to the virtual machine 124A or to hypervisor 128A. The host computing system 120A may establish a network bridge 125A in response to a command received from virtualization manager 114. The host computing system 120A may automatically establish the network bridge 125A with parameters for the associated logical network. When the network bridge 125A is established with parameters matching a definition for the network, the virtualization management server 110 may consider the logical network at the associated NIC in-sync, and may set a network validity attribute for the logical network in the network configuration data store 130.

The parameters of a logical network attached to an NIC by a network bridge 125A may be changed during operation of a host computing system or may initially mismatch the network definition. For example, the parameters may be changed based on a request from virtual machine 124A or a command from a network administrator. When any of the parameters of the logical network are out of synch, the out-of-sync network agent 114 may detect this mismatch by comparing the parameters of the logical network to the parameters defined for the logical network in a network definition. Such a mismatch can cause the logical network to be marked as out-of-sync (or invalid). The out-of-sync network agent 114 may exclude the logical network from the management scope of the virtualization manager in response to determining that the network is out-of-sync. While the logical network is excluded from the management scope of the virtualization manager 112, the host computing system 120A may be blocked from configuring new networks on the NIC, moving the network to another NIC, change configurations of the logical network, or change configurations of the NIC. However, as discussed above, such a mismatch may be intentional or may not affect the proper operation of the logical network.

To address the above inconsistency, the out-of-sync network agent 114 may generate an indicator that the logical network is out-of-sync and may provide this indicator to a network administrator via a user interface (UI) (e.g., over an application programming interface (API), a command line interface (CLI), or a graphical user interface (GUI)). The UI may include an indication that the logical network is out-of-sync at the host computing system 120A and a list of one or more parameters that are identified as out-of-sync. The out-of-sync network agent 114 may also include an indication of the value for the parameter in the network definition.

The out-of-sync network agent 114 may then receive an instruction directing the out-of-sync network agent 114 how to treat the out-of-sync network. For example, the out-of-sync network agent 114 may receive a confirmation of validity of the out-of-sync parameter. The confirmation of validity may be received via input provided by a network administrator to waive the parameter, indicating that it is valid despite being different from the network definition. If the out-of-sync network parameters are waived, the out-of-sync network agent 114 may set a validity parameter for the logical network to ensure that the logical network is included in the management scope of the virtualization manager. If the instruction indicates to sync the logical network, the out-of-sync network agent 114 may instruct the host computing system to replace the out-of-sync parameters with parameters from the definition. If no instruction is received, the logical network may be excluded from the management scope of the host computing system.

Figure 2:
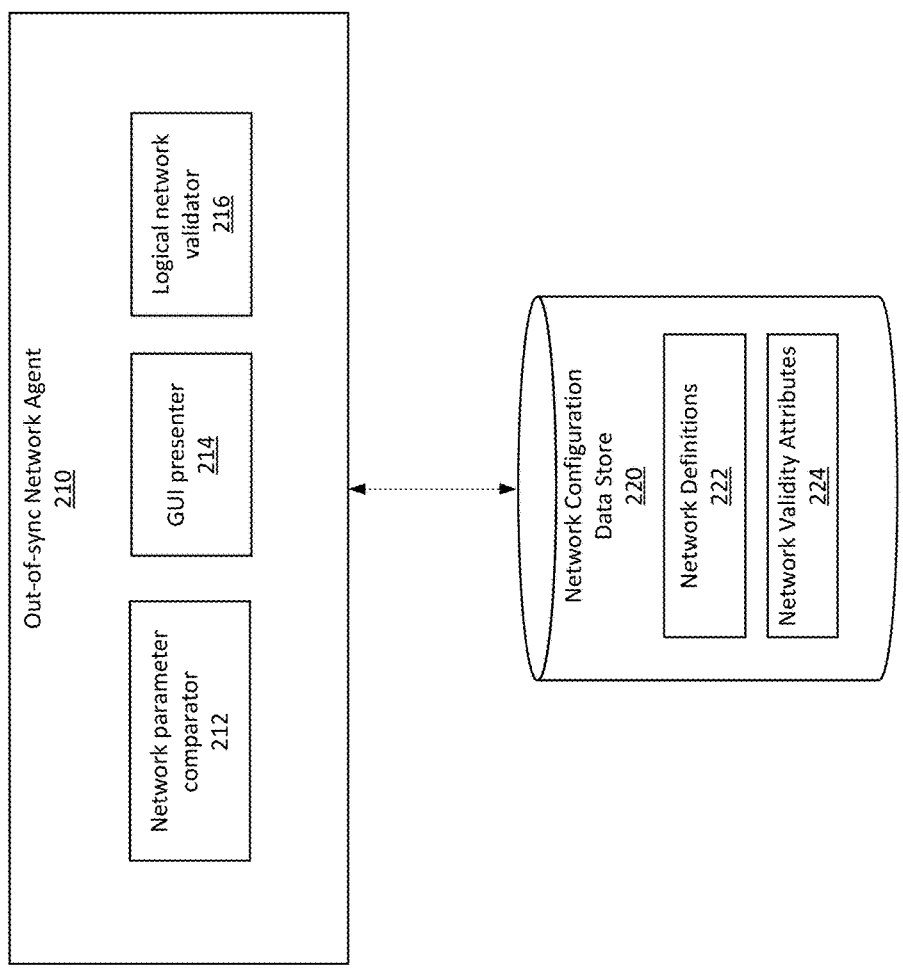
FIG. 2 depicts a block diagram of a system for detecting and mitigating out-of-sync networks, according to one or more aspects of the present disclosure.

FIG. 2 is a block diagram showing additional details of an example implementation of an out-of-sync network agent 210. For example, the out-of-sync network agent 210 may be similar to the out-of-sync network agent 114 described above as part of virtualization management server 110. The out-of-sync network agent 210 may access data in a network configuration data store 220. For example, the out-of-sync network agent 114 may access the network configuration data store 220 over a network or the out-of-sync network agent 114 and network configuration data store 220 may be hosted on the same server. The out-of-sync network agent 114 may include a network parameter comparator 212, a GUI presenter 214, and a logical network validator 216.

The out-of-sync network agent 210 may perform operations to detect and re-configure (mitigate) out-of-sync networks in a network environment. For example, the network parameter comparator 212 may receive a set of network configuration parameters from a host computing system. The host computing system may send information to the out-of-sync network agent 210 through a daemon, such as a Virtual Desktop and Server Manager (VDSM) daemon on a Linux server. The host computing system may send network configuration parameters when the logical network is established, in response to polling by the out-of-sync network agent 210, in response to configuration changes, periodically, or at other times or in response to other events.

The information received from a host computing system may include capabilities of the host computing system such as storage, memory and networking as well as virtual machine creation, other host administration tasks, statistics gathering, and log collection. The networking information received may include data relating to physical devices and virtual networking devices on top of the physical devices. For example, the physical devices may include NICs and the virtual devices may include network bridges, virtual switches, or the like. The networking information may include network parameters set for each of the physical devices and virtual devices.

Network information for a logical network may include parameters for the network such as whether it is a virtual network, a VLAN ID for the network, MTU, QoS constraints, IP configuration, or the like. The network information for each host computer system in the network environment may be stored in the network configuration data store 220. The network configuration data store 220 may also include a set of network definitions 222 that define network parameters for a plurality of logical networks.

The network parameter comparator 212 may determine whether a logical network is out-of-sync based on the data received from a host computing system or stored in network configuration data store 222. For example, a network may have a particular name (e.g., "red") that has a set of parameters defined in a network definition. The network parameter comparator 212 may receive a set of parameters for a logical network having the same name. The network parameter comparator 212 may compare the parameters to see if the values of the parameters of the logical network on the host computer system match the values of the parameters in the network definition. To compare the parameters, the network parameter comparator may determine for each reported parameter whether it has the same value as defined by in the network definitions 222. If each parameter has the same value in the logical network as in the network definition, the logical network may be determined to be in-sync. If one or more of the parameters has a different value in the logical network compared to the network definition, the logical network may be determined to be out-of-sync.

If the logical network is determined to be out-of-sync, the virtualization management system may exclude the logical network from the management scope of a virtualization manager. In addition, the out-of-sync network agent 210 may generate an indication that the network is out-of-sync. The indication may be stored in the network validity attributes 224. It may include an indication that the network is out-of-sync and a list of parameters that are out-of-sync.

The GUI presenter 214 may provide an indication that a logical network is out-of-sync and a list of parameters that do not match the network definition. The GUI presenter 214 may also include values of the parameters from the logical network and from the network definition. The GUI presenter may provide the indication through one or more of a GUI, an API, a CLI, or another interface that provides information to an administrator. For example, FIG. 3, as discussed below, depicts an example graphical user interface that may be generated with an indication that a network is out-of-sync.

The GUI presenter 214 may receive an instruction, indicating how to treat the out-of-sync logical network. For example, the instruction may indicate that the out-of-sync parameters are valid and that the logical network should be included in the management scope of a virtualization manager. The logical network validator 216 may then store an indication that the parameters were waived in the network validity attributes 224, and set validity attribute in the network validity attributes 224 for the logical network.

When the network parameter comparator 212 checks whether a logical network is out-of-sync, it may consider whether one or more parameters for the logical network were previously waived. For example, the network parameter comparator 212 may not check whether a value of a parameter of a logical network matches the value of the parameter in the network definition if that parameter was previously waived for that logical network. In some implementations, the GUI presenter may provide an indication that a logical network is in-sync due to the waiving of one or more parameters.

Figure 3A:
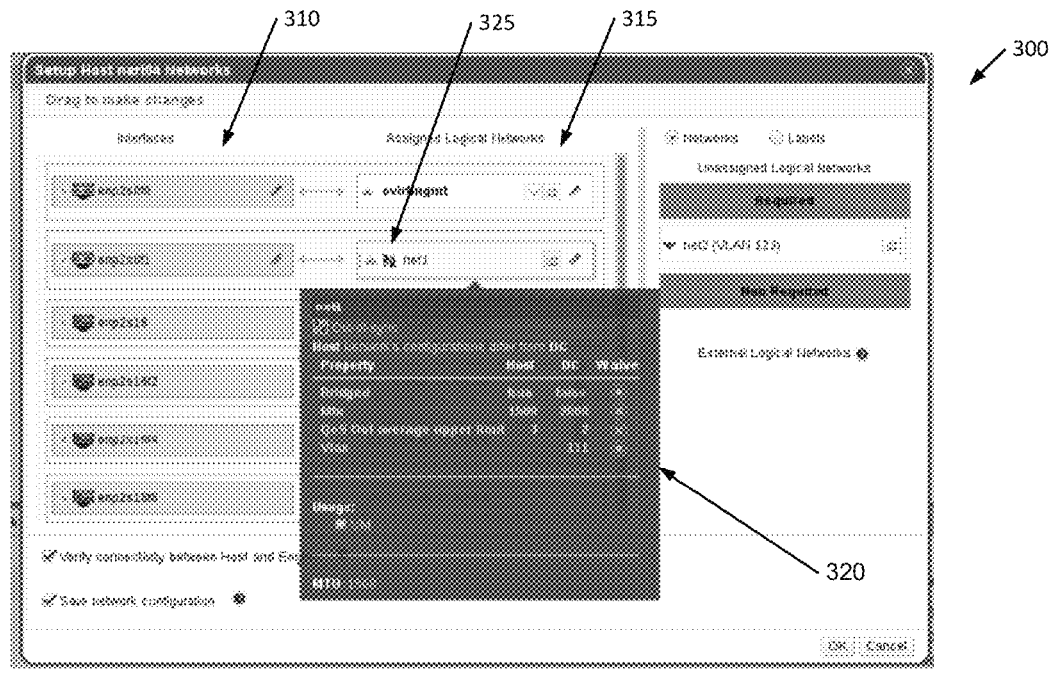
FIG. 3A depicts an example user interface, according to one or more aspects of the present disclosure.
Figure 3B:
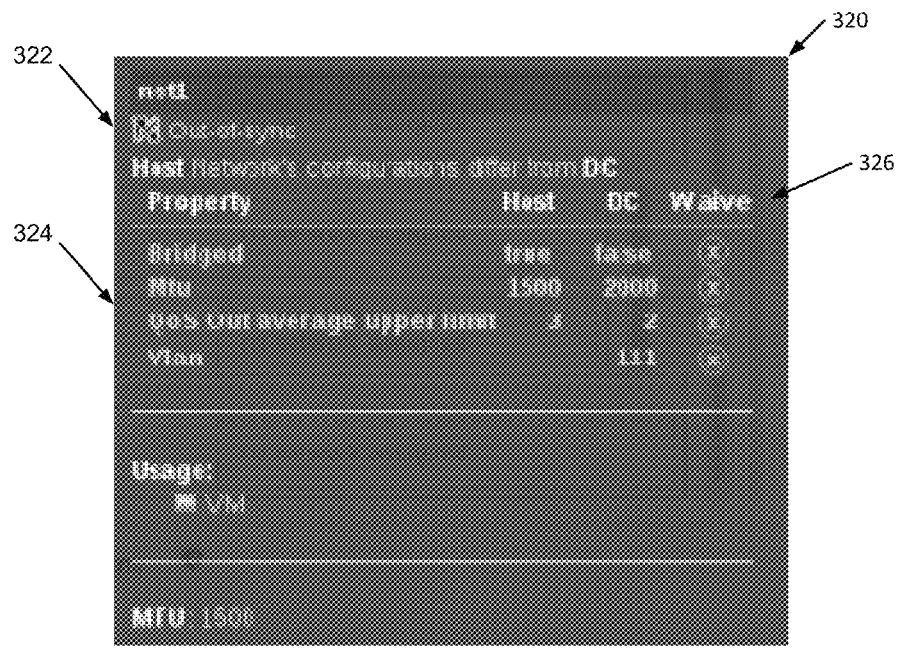
FIG. 3B depicts an example user interface, according to one or more aspects of the present disclosure.

FIGS. 3A and 3b depict aspects of an example user interface 300 showing out-of-sync parameters for an out-of-sync network. The user interface 300, or information included in the user interface 300, may be provided by the administrator portal 132 describe with reference to FIG. 2. User interface 300 lists network interfaces 310 and logical networks associated with the network interfaces 310 for a particular host computing system. In some implementations, the network interfaces 310 correspond to NICs associated with a host computing system. The list of network interfaces 310 may include an identification of each network interface, information about the type of network interface, or other information about the network interface. In some implementations, there may be more than one logical network associated with a network interface. In addition, some network interfaces may not be assigned with any logical network. The user interface 300 may present an out-of-sync indicator 325 in response to an out-of-sync network agent determining that the associated logical network has one or more parameters that do not match the network definition (e.g., is out-of-sync). The user interface 300 may provide a pop-out window 320 to describe additional details of the mismatched parameters. In some implementations, the information may be provided in another format, such as a drop down list, a separate user interface, or the like. The pop-out window 320 is illustrated in more detail in FIG. 3B.

The pop-out window 320 may include an indication 322 that the logical network is out-of-sync and a list of properties 324 and associated values that are mismatched. For example, in user interface 300, properties of "bridged, "MTU," "QoS" out average upper limit," and "VLAN" are listed as out-of-sync with the network definition. For each mismatched parameter, the "Host" parameter at the out-of-sync hypervisor is given as well as the "DC" parameter defined for the network in a network definition. For example, for MTU, a first value of 1500 set at the network bridge of an out-of-sync NIC is provided as well as a network definition value of 2000 for the logical network. In some implementations, the GUI may include an indication that the value of the parameter at the logical network is allowed or allowed to be waived by an administrator.

In some implementations, the list of mismatched parameters may be associated with one or more user interface elements 326 that provide an option to waive the parameter.

For example the elements 326 listed in the pop-out 320 may provide an option to individually waive each of the mismatched parameters. Thus, if the out-of-sync network agent receives an indication that a parameter is waived, it may store an indication marking that parameter is confirmed as valid. The indication that the parameter is confirmed as valid may then be used at a later time when determining if a network is out-of-sync. In some implementations, the user interface 300 may include a user interface element that, when selected, waives all of the mismatched parameters. In some implementations the user interface 300 may include a user interface element that, when selected, causes the out-of-sync network agent to sync the out-of-sync logical network with the values parameters from the network definition. In some implementations, the out-of-sync network agent may only sync those parameters that had not been previously confirmed as valid. In some implementations, the out-of-sync network agent may present the GUI with an indication that the value of the parameter at the logical network is not allowed and request an administrator or user to provide a new value for the parameter. The out-of-sync network agent may then instruct the host computing system to change the value of the parameter for the logical network in response to receiving input, via the GUI, specifying a new value for the network parameter. In some implementations, the user interface 300 may include fewer or additional details than shown in FIGS. 3A and 3B. For example, the user interface may include an indication that a network is considered in-sync because one or more parameters have been waived.

Figure 4:
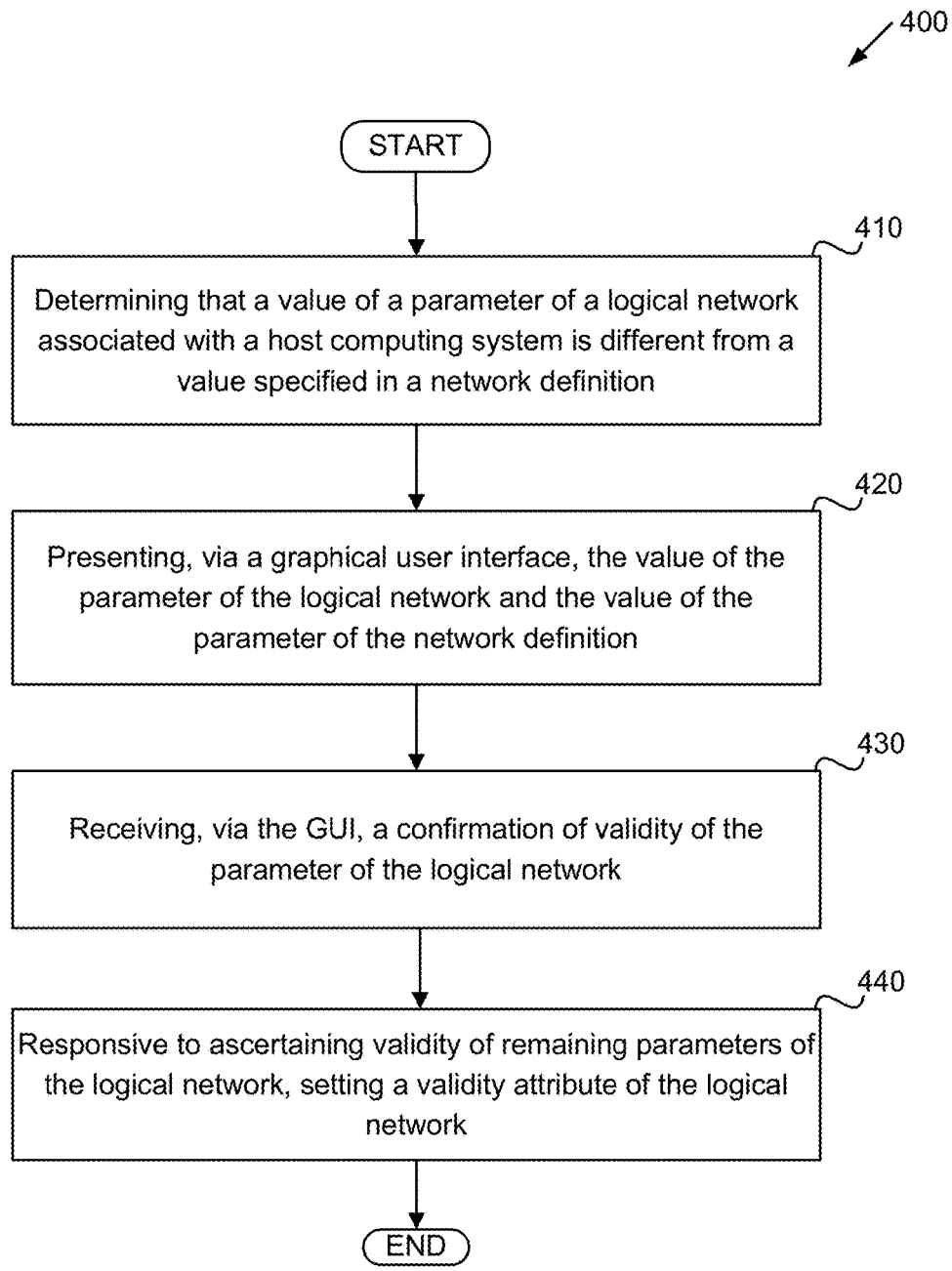
FIG. 4 is a flow diagram of a method for detecting and mitigating out-of-sync networks, according to one or more aspects of the present disclosure.

FIG. 4 is a flow chart depicting a method 400 performed by an out-of-sync network agent in response to determining that a network is out-of-sync, according to an implementation. In block 410, the out-of-sync network agent determines that a value of a parameter of a logical network associated with a host computing system is different from a value specified in a network definition. The out-of-sync network agent may determine that a configuration of a logical network is out-of-sync with a network if one or more parameters of the network are not the same as a network definition. The virtualization management server may make a determination whether a network configuration is out-of-sync in response to receiving a list of parameter values for the network configuration from the host computing system. The host computing system may send a list of parameter values for a network configuration periodically, when a parameter is changed, when requested by an out-of-sync network agent, or at another time.

In block 420, the out-of-sync network agent presents, via a GUI, the value of the parameter of the logical network and the value of the parameter of the network definition. The GUI may include an indication that the logical network is out-of-sync with the network definition. The GUI may also include a user interface element that enables an administrator to treat the mismatched parameter as valid, to provide a new value for the parameter, or to set the value of the parameter to a value from the network definition. In some implementations, the out-of-sync network agent may provide the values of mismatched parameters through a CLI, API, or other interface. The out-of-sync network agent may also store an indicator in a network configuration data store to mark the logical network as out-of-sync. To mark the logical network as out of sync, the out-of-sync network agent may store a flag or other indicator associated with an identifier of the logical network in a network configuration data store that includes parameters defined for a network and parameters of the logical network at one or more host computing systems. The identification may be stored with the identifier of the logical network and the host computing system that is out-of-sync. The out-of-sync network agent may exclude the logical network from the management scope and block operations on the logical network.

In block 430, the out-of-sync network agent receives a confirmation of validity of the parameter of the logical network. The confirmation of validity may be received through the GUI. For example, a user interface element on the GUI may direct the out-of-sync network agent to treat the mismatched parameter as valid. Accordingly, selecting the user interface element may indicate to the out-of-sync network agent that the logical network should be treated as in-sync.

In block 440, responsive to ascertaining validity of remaining parameters of the logical network, the out-of-sync network agent may set a validity attribute of the logical network. For example, the out-of-sync network agent may set a flag in a configuration file associated with the logical network to indicate that the network is valid or in-sync with the network. In some implementations, the validity attribute of the logical network may be set by removing an indication that the logical network is out-of-sync with the network. For example, the out-of-sync network agent may remove an indication that the logical network is out-of-sync that was stored in a network configuration data store. The out-of-sync network agent may also include the logical network in the management scope of the virtualization manager and stop blocking operations on the logical network. In some implementations, the out-of-sync network agent may store an indication that the parameters are mismatched but confirmed as valid so that subsequent determination of whether the logical network is out-of-sync may ignore the mismatched parameters.

In some implementations, the out-of-sync network agent may further determine whether a correction rule applies to a parameter that does not match the network definition. If the out-of-sync network agent determines that an automatic correction rules to a parameter type of the parameter, the out-of-sync network agent may automatically replace the value of the parameter with the value from the network definition. Similarly, the out-of-sync network agent may determine whether a difference between a value of a parameter of a logical network is within a range specified in an automatic correction rule. If the out-of-sync network agent determines that the difference is within a range specified by the rule, it may automatically replace the value of the parameter with the value from the network definition. In some implementations, the out-of-sync network agent may automatically replace the value of the parameter in response to the difference being outside of the specified range instead of being inside the specified range.

Figure 5:
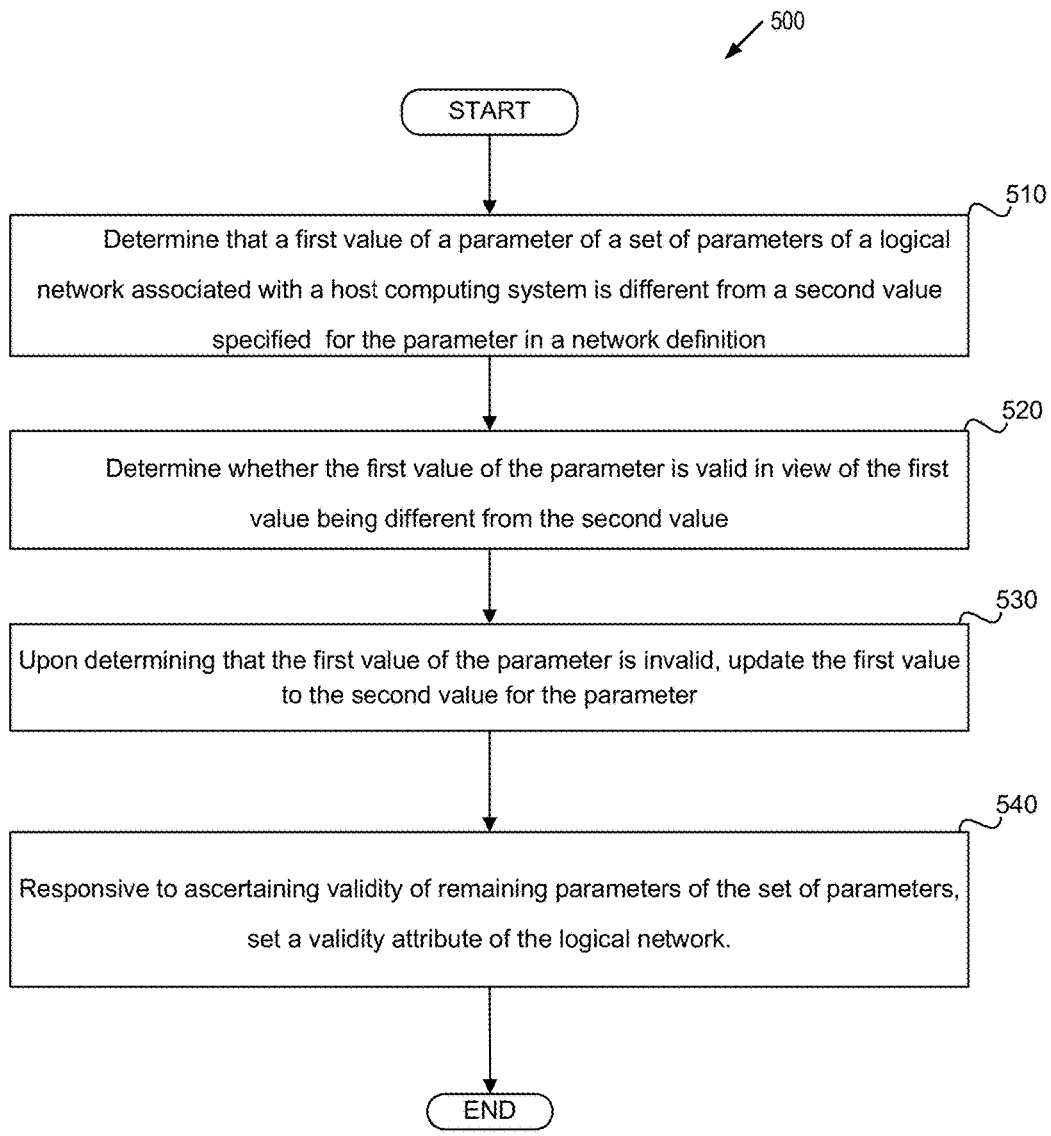
FIG. 5 is a flow diagram of a method for detecting and mitigating out-of-sync networks, according to one or more aspects of the present disclosure.

FIG. 5 is a flow chart depicting a method 500 performed by a virtualization management server to determine whether a network is out-of-sync, according to an implementation. Beginning in block 510, an out-of-sync network agent determines that a first value of a parameter of a set of parameters of a logical network associated with a host computing system is different from a second value specified for the parameter in a network definition. The parameters of the logical network may be provided to the out-of-sync network agent from a host computing systems associated with the logical network. The network definition for the logical network may be stored in a network configuration data store.

In block 520, the out-of-sync network agent determines whether the first value of the parameter is valid in view of the first value being different from the second value. For example, the out-of-sync network agent may determine that the first value is valid based on a set of rules indicating which parameters may be considered valid without matching the network definition. In addition, the rules may indicate a range of values that may be considered valid relative to a value of the network definition.

In block 530, upon determining that the first value of the parameter is invalid, the out-of-sync network agent updates the first value to the second value for the parameter. For example, the out-of-sync network agent may automatically correct the value of the parameter to the value in the network definition.

In block 540, responsive to ascertaining validity of remaining parameters of the logical network, the out-of-sync network agent may set a validity attribute of the logical network. For example, the out-of-sync network agent may set a flag in a configuration file associated with the logical network to indicate that the network is valid or in-sync with the network. In some implementations, the validity attribute of the logical network may be set by removing an indication that the logical network is out-of-sync with the network. For example, the out-of-sync network agent may remove an indication that the logical network is out-of-sync that was stored in a network configuration data store. The out-of-sync network agent may also include the logical network in the management scope of the virtualization manager and stop blocking operations on the logical network. In some implementations, the out-of-sync network agent may store an indication of the parameters are mismatched but confirmed as valid so that subsequent calculations of whether the logical network is out-of-sync will ignore the valid parameters.

Figure 6:
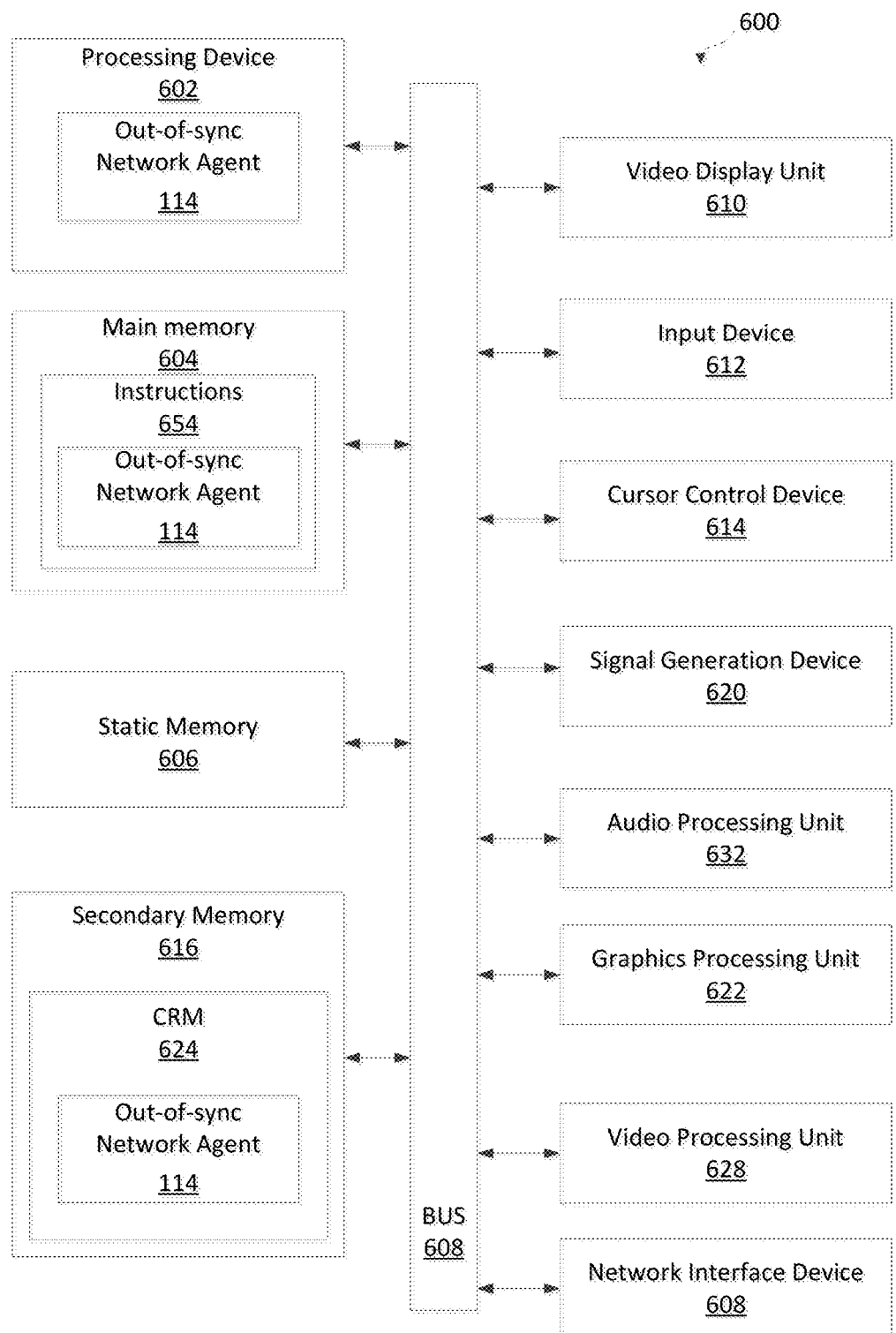
FIG. 6 is a block diagram of an example computer system operating in accordance with one or more aspects of the present disclosure.

FIG. 6 depicts an example computer system 600 which can perform any one or more of the methods described herein for recording and playing back the execution of a program. In one example, computer system 600 may correspond to computer system 100 of FIG. 1. The computer system may be connected (e.g., networked) to other computer systems in a LAN, an intranet, an extranet, or the Internet. The computer system 600 may operate in the capacity of a server in a client-server network environment. The computer system 600 may be a personal computer (PC), a set-top box (STB), a server, a network router, switch or bridge, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 600 includes a processing device 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a secondary memory 616 (e.g., a data storage device), which communicate with each other via a bus 608.

The processing device 602 represents one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core CPU (computer processing unit), a multi-core CPU and a massively multi-core system that includes many interconnected integrated circuits, each of which may include multiple processor cores. The processing device 602 may therefore include multiple processors. The processing device 602 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 602 may also be one or more special-purpose processing devices such as an application specific integrated circuit (ASIC), a field programmable gate array (FPGA), a digital signal processor (DSP), network processor, system on chip (SoC), or the like. The computer system 600 may include a graphics processing unit 622, a video processing unit 628, and an audio processing unit 632.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The secondary memory 616 may include a machine-readable storage medium (or more specifically a computer-readable storage medium (CRM)) 624 on which is stored one or more sets of instructions embodying any one or more of the methodologies or functions described herein (e.g., execution recorder 120). The main memory 604 may also store, completely or partially, instructions 654 embodying any one or more of the methodologies or functions described herein (e.g., execution recorder 120). Furthermore, the processing device 602 may include instructions to implement execution recorder 120 during execution thereof by the computer system 600. The main memory 604 and the processing device 602 may also include machine-readable storage media.

While the computer-readable storage medium 624 is shown in an exemplary implementation to be a single medium, the term "computer-readable storage medium" (or "computer-readable medium") should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine that cause the machine to perform any one or more of the methodologies of the present disclosure. The term "computer-readable storage medium" shall accordingly be taken to include, but not be limited to, non-transitory media such as solid-state memories, and optical and magnetic media.

Figure 7:
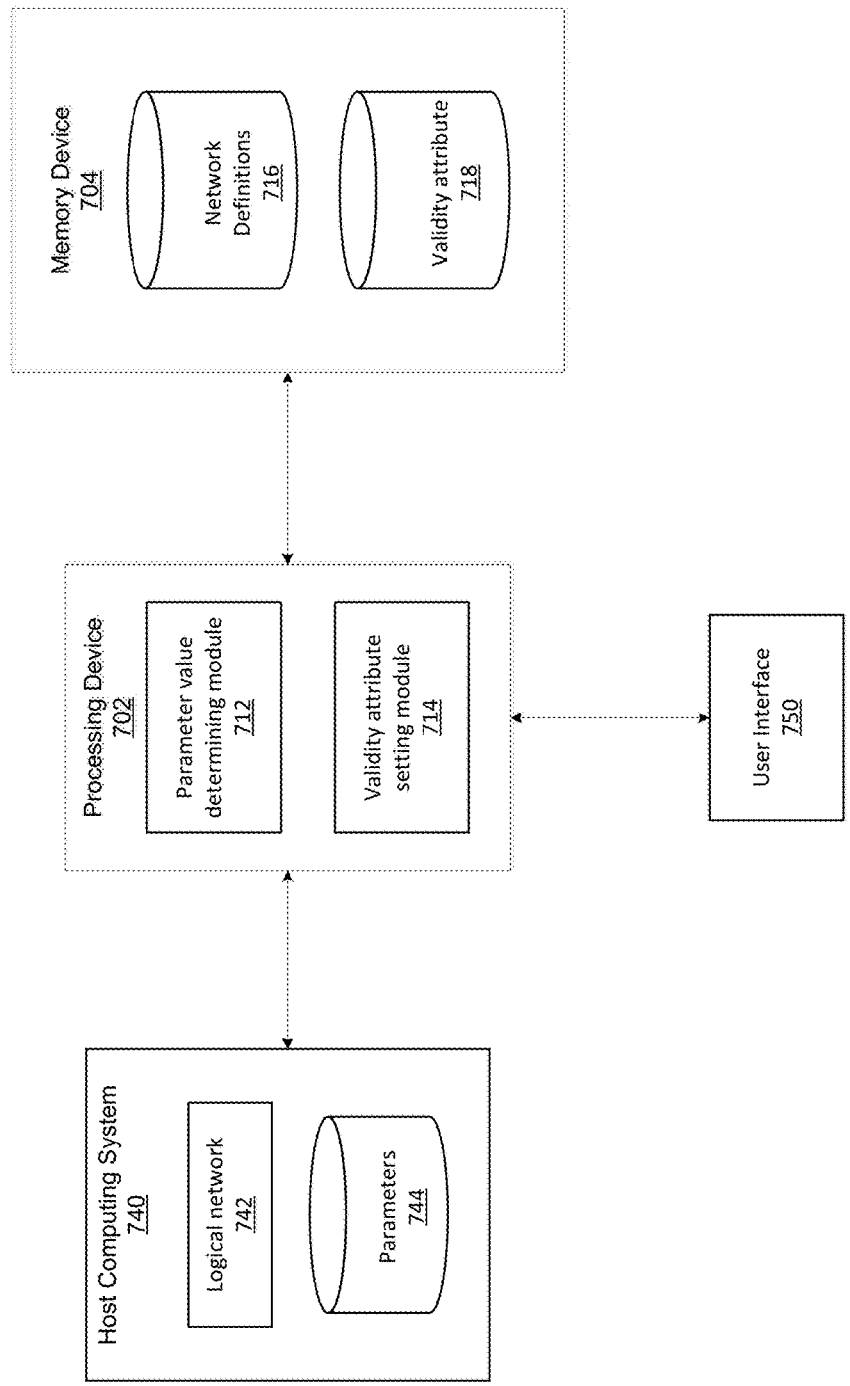
FIG. 7 depicts a block diagram of a system for detecting and mitigating out-of-sync networks, according to one or more aspects of the present disclosure.

FIG. 7 is a block diagram showing additional details of an example implementation of an out-of-sync network agent. For example, the out-of-sync network agent may be similar to the out-of-sync network agent 114 described above as part of virtualization management server 110 in FIG. 1. The system in FIG. 7 may include a processing device 702 coupled to a memory device 704. The processing device 702 may execute a parameter value determining module 712 and a validity attribute setting module 714. For example, in some implementations, the processing device 702 may execute instructions stored on the memory device 704.

The system may perform operations to detect and reconfigure (mitigate) out-of-sync networks in a network environment. For example, parameter value determining module 712 may receive a set of network configuration parameters 744 associated with a logical network 742 from a host computing system 740. The set of parameters 744 may include parameters for the logical network 742 such as whether it is a virtual network, a VLAN ID for the network, MTU, QoS constraints, IP configuration, or the like.

The parameter value determining module 712 may then determine that a first value of a parameter of the logical network 742 associated with the host computing system 740 is different than a value of the parameter in a network definition 716 stored in memory device 704. The parameter value determining module 712 may then determine that the logical network 742 is out-of-sync.

If the logical network 742 is determined to be out-of-sync in view of the parameters 744 and network definitions 716, the processing device 702 may present, via a user interface 750, the value of the parameter from the logical network 742 and the value of the parameter from the network definition 716. The processing device 702 may then receive, via the user interface, a confirmation of validity of the value of the parameter for the logical network 742.

The parameter value determining module 712 may ascertain the validity of the remaining parameters 744. For example, the parameter value determining module 712 may determine the validity of parameters 744 based on receiving a confirmation of validity or automatically determining that a value of each remaining parameter is valid based in its value and a value in a network definition 716. Responsive to the parameter value determining module 712 ascertaining validity of remaining parameters, a validity attribute setting module 714 may set a validity attribute 718 for the logical network 742. The validity attribute 718 may indicate that the parameters 744 of the logical network 742 associated with the host computing system 740 are valid (or in-sync) with the network definition 716. Furthermore, the validity attribute 718 may indicate that the logical network 742 is within the management scope of a virtualization manager.

The modules, components and other features described herein (for example in relation to FIGS. 1 and 2) can be implemented as discrete hardware components or integrated in the functionality of hardware components such as ASICS, FPGAs, DSPs, SoCs, or similar devices. In addition, the modules can be implemented as firmware or functional circuitry within hardware devices. Further, the modules can be implemented in any combination of hardware devices and software components, or only in software.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "recording", "receiving", "determining", "executing", "performing", "interpreting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The terms "first", "second", "third", "fourth", etc. as used herein are meant as labels to distinguish among different elements and may not necessarily have an ordinal meaning according to their numerical designation.

Implementations of the present disclosure also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description above. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other implementations will be apparent to those of skill in the art upon reading and understanding the above description. Although the present disclosure has been described with reference to specific exemplary implementations, it will be recognized that the disclosure is not limited to the implementations described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

In the above description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

What is claimed is:

1. A method comprising:
   determining, by a processing device, that a first value for a parameter of a set of parameters of a logical network associated with a host computing system is different from a second value specified for the parameter in a network definition;
   presenting, via a user interface, the first value and the second value for the parameter;
   receiving, via the user interface, a confirmation of validity of the first value for the parameter; and
   responsive to ascertaining validity of remaining parameters of the set of parameters, setting a validity attribute of the logical network.

2. The method of claim 1, wherein the logical network is implemented by a bridge associated with a network interface card (NIC) of the host computer system.

3. The method of claim 1, wherein the set of parameters comprises one or more of a virtual local area network identifier (VLAN ID), a maximum transmission unit (MTU), a maximum bandwidth, a minimum bandwidth, or an Internet Protocol (IP) address.

4. The method of claim 1, further comprising including the logical network in a management scope of a virtualization manager executed by the processing device in response to receiving the confirmation of validity of the first value of the parameter.

5. The method of claim 1, further comprising storing, in a configuration data store, an indication that the first value of the parameter has been confirmed as valid for the logical network, wherein the indication is stored in association with an identifier of the logical network.

6. The method of claim 1, further comprising:
   determining that a third value for a second parameter of the set of parameters is different from a fourth value specified for the second parameter in the network definition;
   determining that an automated correction rule applies to a parameter type of the second parameter; and
   automatically replacing the third value with the fourth value for the second parameter.

7. The method of claim 1, further comprising:
   determining that a third value for a second parameter of the set of parameters is different from a fourth value specified for the second parameter in the network definition;
   determining whether a difference between the third value and the fourth value is within a range specified in an automated correction rule;
   responsive to the difference between the third value and the fourth value not being within the specified range, automatically replacing the third value with the fourth value for the second parameter; and
   responsive to the difference between the third value and the fourth value being within the specified range, refraining from automatically replacing the third value with the fourth value for the second parameter.

8. The method of claim 1, wherein the user interface comprises an indication that the first value is allowed for the parameter.

9. The method of claim 1, wherein receiving, via the user interface, the confirmation of the validity of the first value for the parameter comprises:
   presenting, in the user interface, an indication that the first value is not allowed for the parameter, and requesting a user to change the first value; and
   receiving user input specifying a third value for the parameter, the third value being closer to the second value than the first value.

10. A system comprising:
    a memory device; and
    a processing device coupled to the memory device, the processing device to:
       determine, by a processing device, that a first value for a parameter of a set of parameters of a logical network associated with a host computing system is different from a second value specified for the parameter in a network definition;
       present, via a user interface, the first value and the second value for the parameter;
       receive, via the user interface, a confirmation of validity of the first value for the parameter; and
       responsive to ascertaining validity of remaining parameters of the set of parameters, set a validity attribute of the logical network.

11. The system of claim 10, wherein the user interface is a graphical user interface (GUI), command line interface (CLI), or application programming interface (API).

12. The system of claim 10, wherein the processing device is further to include the logical network in a management scope of a virtualization manager executed by the processing device in response to receiving the confirmation of validity of the first value of the parameter.

13. The system of claim 10, wherein the processing device is further to store, in a configuration data store, an indication that the first value of the parameter has been confirmed as valid for the logical network, wherein the indication is stored in association with an identifier of the logical network.

14. The system of claim 10, wherein the processing device is further to:
    determine that a third value for a second parameter of the set of parameters is different from a fourth value specified for the second parameter in the network definition;
    determine that an automated correction rule applies to a parameter type of the second parameter; and
    automatically replace the third value with the fourth value for the second parameter.

15. The system of claim 10, wherein the processing device is further to:
    determine that a third value for a second parameter of the set of parameters is different from a fourth value specified for the second parameter in the network definition;
    determine whether a difference between the third value and the fourth value is within a range specified in an automated correction rule;
    responsive to the difference between the third value and the fourth value not being within the specified range, automatically replace the third value with the fourth value for the second parameter; and
    responsive to the difference between the third value and the fourth value being within the specified range, refraining from automatically replacing the third value with the fourth value for the second parameter.

16. The system of claim 10, wherein the user interface comprises an indication that the first value is allowed for the parameter.

17. The system of claim 10, wherein to receive, via the user interface the confirmation of the validity of the first value for the parameter the processing device is further to:

present, in the user interface, an indication that the first value is not allowed for the parameter, and requesting a user to change the first value; and receive user input specifying a third value for the parameter, the third value being closer to the second value than the first value.

18. A non-transitory computer readable medium, having instructions encoded thereon that when executed by a processing device cause the processing device to:

determine that a first value of a parameter of a set of parameters of a logical network associated with a host computing system is different from a second value specified for the parameter in a network definition;

determine whether the first value of the parameter is valid in view of the first value being different from the second value;

upon determining that the first value of the parameter is invalid, update the first value to the second value for the parameter; and responsive to ascertaining validity of remaining parameters of the set of parameters, set a validity attribute of the logical network.

19. The non-transitory computer readable medium of claim 18, wherein to determine whether the first value of the parameter is valid the instructions further cause the processing device to determine that an automated correction rule applies to a parameter type of the second parameter.

20. The non-transitory computer readable medium of claim 18, wherein to determine whether the first value of the parameter is valid the instructions further cause the processing device to:

determine a difference between the first value and the second value; and determine whether the difference is within a range specified in an automatic correction rule.

* * * * *